United States Patent
Ross et al.

(10) Patent No.: US 9,556,303 B2
(45) Date of Patent: *Jan. 31, 2017

(54) CATALYSTS FOR POLYURETHANE FOAM POLYOL PREMIXES CONTAINING HALOGENATED OLEFIN BLOWING AGENTS

(75) Inventors: Michael A. Ross, Morristown, NJ (US); Ronald Grossman, Morristown, NJ (US); David J. Williams, Morristown, NJ (US); Clifford P. Gittere, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 415 days.

This patent is subject to a terminal disclaimer.

(21) Appl. No.: 13/400,563

(22) Filed: Feb. 20, 2012

(65) Prior Publication Data

US 2012/0248371 A1 Oct. 4, 2012

Related U.S. Application Data

(60) Provisional application No. 61/445,022, filed on Feb. 21, 2011, provisional application No. 61/445,027, filed on Feb. 21, 2011.

(51) Int. Cl.

| | |
|---|---|
| *C08G 18/16* | (2006.01) |
| *C08J 9/14* | (2006.01) |
| *C08G 18/50* | (2006.01) |
| *C08G 18/76* | (2006.01) |
| *C08G 18/18* | (2006.01) |
| *C08G 18/22* | (2006.01) |
| *C08G 18/26* | (2006.01) |
| *C08G 18/40* | (2006.01) |
| *C08G 18/42* | (2006.01) |
| *C08G 18/48* | (2006.01) |
| *C08G 18/54* | (2006.01) |
| *C08G 18/09* | (2006.01) |
| *C08G 18/20* | (2006.01) |
| *C08G 18/24* | (2006.01) |
| *C08G 101/00* | (2006.01) |

(52) U.S. Cl.
CPC ........... *C08G 18/163* (2013.01); *C08G 18/092* (2013.01); *C08G 18/1808* (2013.01); *C08G 18/1816* (2013.01); *C08G 18/2081* (2013.01); *C08G 18/225* (2013.01); *C08G 18/227* (2013.01); *C08G 18/244* (2013.01); *C08G 18/26* (2013.01); *C08G 18/4018* (2013.01); *C08G 18/4208* (2013.01); *C08G 18/4804* (2013.01); *C08G 18/5021* (2013.01); *C08G 18/546* (2013.01); *C08G 18/7664* (2013.01); *C08J 9/146* (2013.01); *C08G 2101/00* (2013.01); *C08G 2101/0033* (2013.01); *C08G 2105/02* (2013.01); *C08G 2410/00* (2013.01); *C08J 2203/162* (2013.01); *C08J 2375/04* (2013.01)

(58) Field of Classification Search
CPC . C08G 18/092; C08G 18/163; C08G 18/1808; C08G 18/1816; C08G 18/2081; C08G 18/225; C08G 18/227; C08G 18/244; C08G 18/26; C08G 18/4018; C08G 18/4208; C08G 18/4804; C08G 18/5021; C08G 18/546; C08G 18/7664; C08G 2101/00; C08G 2101/0033; C08G 2105/02; C08G 2410/00; C08J 9/146; C08J 2203/162; C08J 2375/04
USPC ............... 521/123, 124, 125, 126, 127, 128, 129,521/130, 131, 170; 252/182.24
See application file for complete search history.

(56) References Cited

U.S. PATENT DOCUMENTS

| | | | |
|---|---|---|---|
| 2,834,748 | A | 5/1958 | Bailey et al. |
| 2,846,458 | A | 8/1958 | Haluska |
| 2,917,480 | A | 12/1959 | Bailey et al. |
| 3,001,973 | A | 9/1961 | Piepenbrink et al. |
| 3,124,605 | A | 3/1964 | Wagner |
| 3,201,372 | A | 8/1965 | Wagner |
| 3,277,138 | A | 10/1966 | Holtschmidt et al. |
| 3,394,164 | A | 7/1968 | McClellan et al. |
| 3,401,190 | A | 9/1968 | Schmitt et al. |
| 3,454,606 | A | 7/1969 | Brotherton et al. |
| 3,492,330 | A | 1/1970 | Trecker et al. |
| 4,147,847 | A | 4/1979 | Schweiger |
| 4,868,224 | A | 9/1989 | Harasin et al. |
| 6,403,847 | B1 | 6/2002 | Nakada et al. |
| 6,844,475 | B1 | 1/2005 | Tung et al. |
| 7,189,884 | B2 | 3/2007 | Mukhopadhyay et al. |
| 7,230,146 | B2 | 6/2007 | Merkel et al. |
| 2008/0255262 | A1* | 10/2008 | De Vos et al. ............... 521/155 |

(Continued)

OTHER PUBLICATIONS

"The Scientific Assessment of Ozone Depletion, 2002," a report of the World Meteorological Association's Global Ozone Research and Monitoring Project (CH) (too voluminous).

(Continued)

*Primary Examiner* — John Cooney
(74) *Attorney, Agent, or Firm* — Colleen D. Szuch

(57) ABSTRACT

The invention provides polyurethane and polyisocyanurate foams and methods for the preparation thereof. More particularly, the invention relates to closed-celled, polyurethane and polyisocyanurate foams and methods for their preparation. The foams are characterized by a fine uniform cell structure and little or no foam collapse. The foams are produced with a polyol premix composition which comprises a combination of a hydrohaloolefin blowing agent, a polyol, a silicone surfactant, and a non-amine catalyst used alone or in combination with an amine catalyst.

10 Claims, 3 Drawing Sheets

(56) References Cited

U.S. PATENT DOCUMENTS

2009/0099274 A1* 4/2009 Van Der Puy et al. ...... 521/110
2010/0280141 A1* 11/2010 Loh et al. .................... 521/155

OTHER PUBLICATIONS

Saunders and Frisch, "Polyurethanes Chemistry and Technology," vols. I and II, 1962, Ed., John Wiley and Sons, New York, N.Y. (US) (too voluminous).
Gum, Reese, Ulrich, "Reaction Polymers," 1992, Oxford University Press, New York, N.Y (US) (too voluminous).
Klempner and Sendijarevic, "Polymeric Foams and Foam Technology," 2004, Hanser Gardner Publications, Cincinnati, OH (US) (too voluminous).
King Industries, Inc., "High Performance Products for Coatings, Inks, Adhesives and Sealants," (Brochure) King Industries Specialty Chemicals, copyright 2006, Norwalk, CT (US).
King Industries, Inc., "Preliminary Data Sheet—K-KAT and XC-C227," Product Data Sheet, Issued Nov. 6, 2003, p. 1-3, King Industries Specialty Chemicals, Norwalk, CT (US).

* cited by examiner

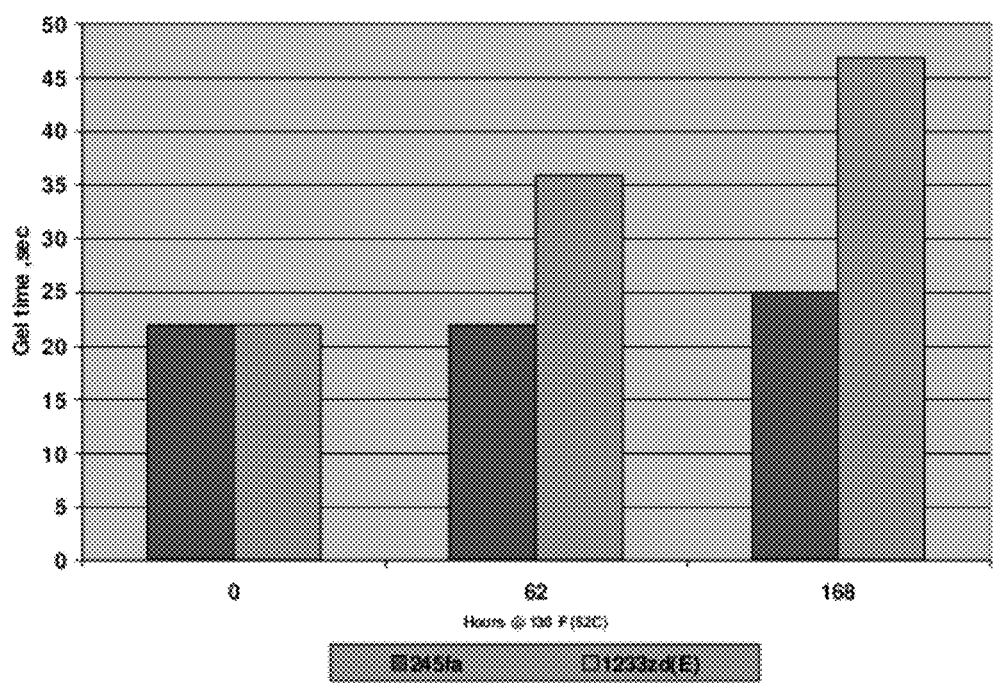
FIGURE 1 - RESULTS OF EXAMPLE 1

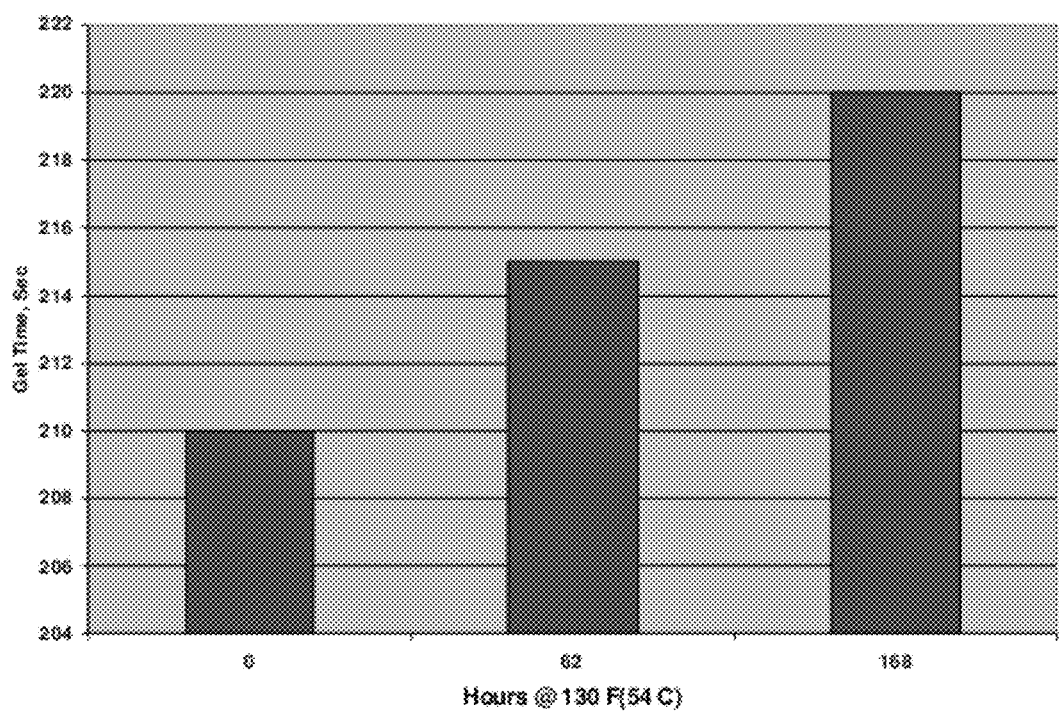
FIGURE 2 – RESULTS OF EXAMPLE 2

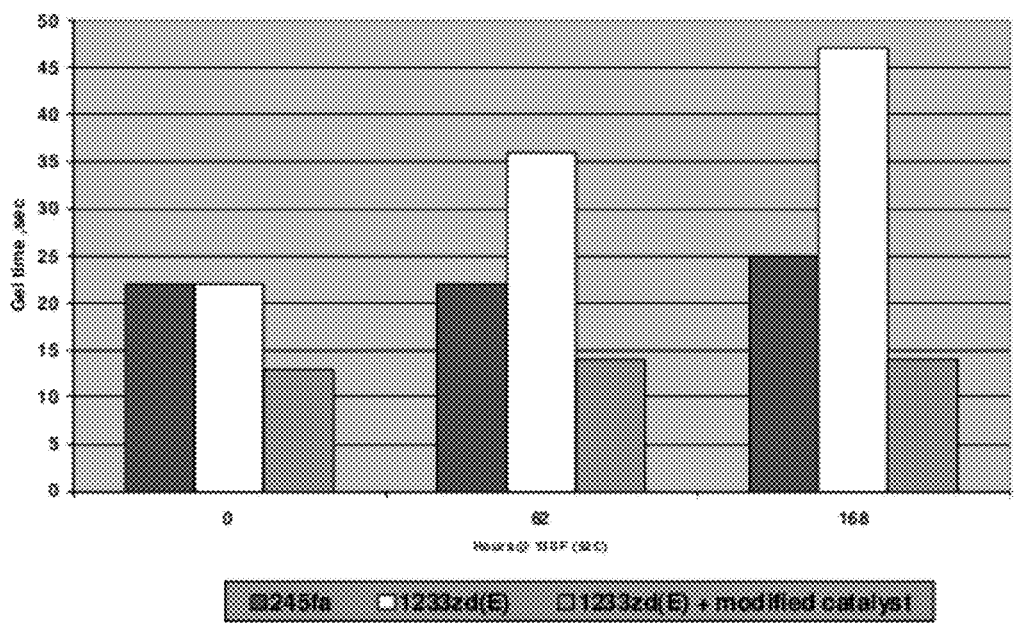
FIGURE 3 – RESULTS FROM EXAMPLE 3B

CATALYSTS FOR POLYURETHANE FOAM POLYOL PREMIXES CONTAINING HALOGENATED OLEFIN BLOWING AGENTS

CROSS REFERENCE TO RELATED APPLICATIONS

The present invention relates to and claims the priority benefit of each of U.S. Application 61/445,027, filed Feb. 21, 2011 and U.S. Application 61/445,022, filed Feb. 21, 2011, each of which is incorporated herein by reference in its entirety as if fully set forth below.

Also incorporated herein by reference is concurrently filed application, which has been accorded U.S. patent application Ser. No. 13/400,559, and the filing date of Feb. 20, 2012.

FIELD OF THE INVENTION

The present invention pertains to polyurethane and polyisocyanurate foams, to blowing agents and catalyst systems and methods for the preparation thereof.

BACKGROUND OF THE INVENTION

Low density, rigid to semi-rigid polyurethane or polyisocyanurate foams have utility in a wide variety of insulation applications including roofing systems, building panels, building envelope insulation, spray applied foams, one and two component froth foams, insulation for refrigerators and freezers, and so called integral skin for application such as steering wheels and other automotive or aerospace cabin parts, shoe soles, and amusement park restraints. Critical to the large-scale commercial acceptance of rigid polyurethane foams is their ability to provide a good balance of properties. For example, rigid polyurethane and polyisocyanurate foams are known to provide outstanding thermal insulation, excellent fire resistance properties, and superior structural properties at reasonably low densities. Integral skin foams are known to produce a tough durable outer skin and a cellular, cushioning core.

It is known in the art to produce rigid or semi-rigid polyurethane and polyisocyanurate foams by reacting a polyisocyanate with one or more polyols in the presence of one or more blowing agents, one or more catalysts, one or more surfactants and optionally other ingredients. Blowing agents include hydrocarbons, fluorocarbons, chlorocarbons, chlorofluorocarbons, hydrochlorofluorocarbons, halogenated hydrocarbons, ethers, esters, aldehydes, alcohols, ketones, organic acid or gas, most often $CO_2$, generating materials. Heat is generated when the polyisocyanate reacts with the polyol, and volatilizes the blowing agent contained in the liquid mixture, thereby forming bubbles therein. In the case of gas generating materials, gaseous species are generated by thermal decomposition or reaction with one or more of the ingredients used to produce the polyurethane or polyisocyanurate foam. As the polymerization reaction proceeds, the liquid mixture becomes a cellular solid, entrapping the blowing agent in the foam's cells. If a surfactant is not used in the foaming composition, the bubbles simply pass through the liquid mixture without forming a foam or forming a foam with large, irregular cells rendering it not useful.

The foam industry has historically used liquid fluorocarbon blowing agents because of their ease of use and ability to produce foams with superior mechanical and thermal insulation properties. Fluorocarbons not only act as blowing agents by virtue of their volatility, but also are encapsulated or entrained in the closed cell structure of the rigid foam and are the major contributor to the low thermal conductivity properties of the rigid urethane foams. Fluorocarbon-based blowing agents also produce a foam having a favorable k-factor. The k-factor is the rate of transfer of heat energy by conduction through one square foot of one-inch thick homogenous material in one hour where there is a difference of one degree Fahrenheit perpendicularly across the two surfaces of the material. Since the utility of closed-cell polyurethane-type foams is based, in part, on their thermal insulation properties, it would be advantageous to identify materials that produce lower k-factor foams.

Preferred blowing agents also have low global warming potential. Among these are hydrohaloolefins including hydrofluoroolefins of which trans-1,3,3,3-tetrafluoropropene (1234ze(E)) and 1,1,1,4,4,4hexafluorobut-2-ene (1336mzzm(Z)) are of particular interest and hydrochlorofluoroolefins of which trans-1-chloro-3,3,3-trifluoropropene (1233zd(E)) is of particular interest. Processes for the manufacture of trans-1,3,3,3-tetrafluoropropene are disclosed in U.S. Pat. Nos. 7,230,146 and 7,189,884. Processes for the manufacture of trans-1-chloro-3,3,3-trifluoropropene are disclosed in U.S. Pat. Nos. 6,844,475 and 6,403,847.

It is convenient in many applications to provide the components for polyurethane or polyisocyanurate foams in pre-blended formulations. Most typically, the foam formulation is pre-blended into two components. The polyisocyanate and optionally isocyanate compatible raw materials, including but not limited to certain blowing agents and non-reactive surfactants, comprise the first component, commonly referred to as the "A" component. A polyol or mixture of polyols, one or more surfactant, one or more catalyst, one or more blowing agent, and other optional components including but not limited to flame retardants, colorants, compatibilizers, and solubilizers comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and other polyols can be added to the mixing head or reaction site. Most conveniently, however, they are all incorporated into one B component.

Applicants have come to appreciate that a shortcoming of two-component systems, especially those using certain hydrohaloolefins, including 1234ze(E), 1336(Z), and 1233zd(E), is the shelf-life of the B-side composition. Normally when a foam is produced by bringing together the A and B side components, a good foam is obtained. However, applicants have found that if the polyol premix composition containing a halogenated olefin blowing agent and a typical amine-containing catalyst is aged, prior to treatment with the polyisocyanate, deleterious effects can occur. For example, applicants have found that such formulations can produce a foamable composition which has an undesirable increase in reactivity time and/or a subsequent cell coalescence. The resulting foams are of lower quality and/or may even collapse during the formation of the foam.

SUMMARY

It has now been found that one source of the problem observerd by applicants is the reaction of certain amine catalysts with certain hydrohaloolefins. Although applicants do not wish to be bound by or to any particular theory, it is believed that such reactions have both direct and indirect deleterious effects. For example, the decomposition reaction depletes the availability of the amine catalyst and hence has a negative effect on reaction times and the quality of foam. In addition, the decomposition reaction produces fluorine ions which can have a native of effect on other components in the pre-mixed and/or foamable composition and/or foam, including the surfactant included in such materials.

As a result of extensive testing, applicants have come to appreciate that the negative effects that have been observed can be overcome by a careful and judicious selection of the catalyst system which is used. More specifically, applicants have found that a catalyst system which uses relatively little, and preferably contains no substantial amount of amine catalysts and a relatively high percentage, and substantially consists essentially of metallic catalyst (e.g. inorgano-metallic catalysts, organo-metallic catalysts) and/or one or more optional quaternary ammonium carboxylate catalysts.

In addition, while applicants believe that all halogenated olefin blowing agents will exhibit some level of the deleterious effects mentioned above, applicants had surprisingly and unexpectedly found that a certain halogenated olefin, particularly monochloro-trifluoropropenes and even more particularly trans-1-chloro-3,3,3-trifluoropropene (1233zd (E)), tend to exhibit only a relatively low level of the deleterious effect, especially when used in combination with catalyst which contains a relatively low level, and preferably no substantial amount of amine-containing catalyst.

Thus, according to one aspect of the invention, applicants have found that blowing agents, foamable compositions, pre-mixes and foams which utilize metal catalysts (and/or the optional carboxylate catalysts), either alone or in combination with a relatively small amount of amine catalyst, can extend the shelf life of polyol premixes containing hydrohaloolefins. This advantage is believed to be present with hydrohaloolefins generally, more preferably but not limited to 1234ze(E), 1233zd(E), and/or 1336mzzm(Z), and even more preferably with 1233zd(E). Applicants have found that good quality foams can be produced according to the present invention even if the polyol blend has been aged several weeks or months.

One aspect of the invention therefore relates to foaming catalysts comprising one or more metal catalysts and optionally amine catalyst, preferably in minor proportion, of a type and in an amount effective to preferably provide little to no loss of reactivity and/or cell structure (ie, shelf life) over time (preferably at least about two (2) months) when combined with hydrohaloolefin blowing agent, preferably 1234ze(E), 1233zd(E), and/or 1336mzzm(Z), while achieving a reactivity profile similar to a typical amine based catalyst system blowing agents, and to blowing agent compositions, pre-mix compositions, foamable compositions and foams containing or made from the catalyst.

According to one aspect, this invention relates to rigid to semi-rigid, polyurethane and polyisocyanurate foams and methods for their preparation, which foams are characterized by a fine uniform cell structure and little or no foam collapse. The foams are produced with an organic polyisocyanate and a polyol premix composition which comprises a combination of a blowing agent, which is preferably a hydrohaloolefin, a polyol, a silicone surfactant, and a catalyst in which catalyst comprises one or more non-amine catalyst, preferably an inorgano- or organo-metallic compound and/or a carboxylate catalyst, preferably a quaternary ammonium carboxylate catalyst, and also may include one or more amine catalysts, preferably in a minor proportion based on all the catalysts in the system.

BRIEF DESCRIPTION ON OF THE DRAWINGS

FIG. 1 is a graphical representation of the results according to the description in Example 1.
FIG. 2 is a graphical representation of the results according to the description in Example 2.
FIG. 3 is a graphical representation of the results according to the description in Example 3.

DETAILED DESCRIPTION OF THE INVENTION

Although applicants do not intend to be bound by or to any particular theory of operation, it is believed that the deleterious effects observed by applicants may be occurring as a result of the reaction between the hydrohaloolefin blowing agent and the amine catalysts to produce a fluoride ion, which leads to a decrease in the reactivity of the blowing agent. In addition, applicants believe that the deleterious effects may also be caused, either alone or in addition to the above cause, by the fluoride ion produced from the above noted reaction in turn reacting with silicone surfactant present in such blowing agents and related systems to produce a lower average molecular weight surfactant, which is then a less effective than originally intended. This depletion/degradation of the surfactant tends to reduce the integrity of the cell wall and hence tends to produce a foam that is subject higher than desired levels of cell collapse.

The invention provides polyol premix composition which comprises a combination of a blowing agent, one or more polyols, one or more silicone surfactants, and a catalyst in which catalyst is a non-amine catalyst, such as an inorgano- or organo-metallic compound or quaternary ammonium carboxylate material used either alone or in combination with amine catalysts, wherein the blowing agent comprises one or more hydrohaloolefins, and optionally a hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, water or combinations thereof.

The invention also provides a method of preparing a polyurethane or polyisocyanurate foam comprising reacting an organic polyisocyanate with the polyol premix composition.

The Hydrohaloolefin Blowing Agent

The blowing agent component comprises a hydrohaloolefin, preferably comprising at least one or a combination of 1234ze(E), 1233zd(E), and/or 1336mzzm(Z), and optionally a hydrocarbon, fluorocarbon, chlorocarbon, fluorochlorocarbon, halogenated hydrocarbon, ether, fluorinated ether, ester, alcohol, aldehyde, ketone, organic acid, gas generating material, water or combinations thereof.

The hydrohaloolefin preferably comprises at least one halooalkene such as a fluoroalkene or chlorofluoroalkene containing from 3 to 4 carbon atoms and at least one carbon-carbon double bond. Preferred hydrohaloolefins non-exclusively include trifluoropropenes, tetrafluoropropenes such as (1234), pentafluoropropenes such as (1225), chlorotrifloropropenes such as (1233), chlorodifluoropropenes, chlorotrifluoropropenes, chlorotetrafluoropropenes, hexafluorobutenes (1336) and combinations of these. More preferred for the compounds of the present invention are the tetrafluoropropene, pentafluoropropene, and chlorotrifloropropene compounds in which the unsaturated terminal carbon has not more than one F or Cl substituent. Included are 1,3,3,3-tetrafluoropropene (1234ze); 1,1,3,3-tetrafluoropropene; 1,2,3,3,3-pentafluoropropene (1225ye), 1,1,1-trifluoropropene; 1,2,3,3,3-pentafluoropropene, 1,1,1,3,3-pentafluoropropene (1225zc) and 1,1,2,3,3-pentafluoropropene (1225yc); (Z)-1,1,1,2,3-pentafluoropropene (1225yez); 1-chloro-3,3,3-trifluoropropene (1233zd), 1,1,1,4,4,4-hexafluorobut-2-ene (1336mzzm) or combinations thereof, and any and all stereoisomers of each of these.

Preferred hydrohaloolefins have a Global Warming Potential (GWP) of not greater than 150, more preferably not greater than 100 and even more preferably not greater than 75. As used herein, "GWP" is measured relative to that of carbon dioxide and over a 100-year time horizon, as defined in "The Scientific Assessment of Ozone Depletion, 2002, a report of the World Meteorological Association's Global Ozone Research and Monitoring Project," which is incorporated herein by reference. Preferred hydrohaloolefins also preferably have an Ozone Depletion Potential (ODP) of not greater than 0.05, more preferably not greater than 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

Coblowing Agents

Preferred optional co-blowing agents non-exclusively include water, organic acids that produce $CO_2$ and/or CO, hydrocarbons; ethers, halogenated ethers; esters, alcohols, aldehydes, ketones, pentafluorobutane; pentafluoropropane; hexafluoropropane; heptafluoropropane; trans-1,2 dichloroethylene; methylal, methyl formate; 1-chloro-1,2,2,2-tetrafluoroethane (124); 1,1-dichloro-1-fluoroethane (141b); 1,1,1,2-tetrafluoroethane (134a); 1,1,2,2-tetrafluoroethane (134); 1-chloro 1,1-difluoroethane (142b); 1,1,1,3,3-pentafluorobutane (365mfc); 1,1,1,2,3,3,3-heptafluoropropane (227ea); trichlorofluoromethane (11); dichlorodifluoromethane (12); dichlorofluoromethane (22); 1,1,1,3,3,3-hexafluoropropane (236fa); 1,1,1,2,3,3-hexafluoropropane (236ea); 1,1,1,2,3,3,3-heptafluoropropane (227ea), difluoromethane (32); 1,1-difluoroethane (152a); 1,1,1,3,3-pentafluoropropane (245fa); butane; isobutane; normal pentane; isopentane; cyclopentane, or combinations thereof. In certain embodiments the co-blowing agent(s) include one or a combination of water and/or normal pentane, isopentane or cyclopentane, which may be provided with one or a combination of the hydrohaloolefin blowing agents discussed herein. The blowing agent component is usually present in the polyol premix composition in an amount of from about 1 wt. % to about 30 wt. %, preferably from about 3 wt. % to about 25 wt. %, and more preferably from about 5 wt. % to about 25 wt. %, by weight of the polyol premix composition. When both a hydrohaloolefin and an optional blowing agent are present, the hydrohaloolefin component is usually present in the blowing agent component in an amount of from about 5 wt. % to about 90 wt. %, preferably from about 7 wt. % to about 80 wt. %, and more preferably from about 10 wt. % to about 70 wt. %, by weight of the blowing agent component; and the optional blowing agent is usually present in the blowing agent component in an amount of from about 95 wt. % to about 10 wt. %, preferably from about 93 wt. % to about 20 wt. %, and more preferably from about 90 wt. % to about 30 wt. %, by weight of the blowing agent component.

Polyol Component

The polyol component, which includes mixtures of polyols, can be any polyol which reacts in a known fashion with an isocyanate in preparing a polyurethane or polyisocyanurate foam. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; glycerol; ethylene glycol; diethylene glycol; propylene glycol; graft copolymers of polyether polyols with a vinyl polymer; a copolymer of a polyether polyol with a polyurea; one or more of (a) condensed with one or more of (b), wherein (a) is selected from glycerine, ethylene glycol, diethylene glycol, trimethylolpropane, ethylene diamine, pentaerythritol, soy oil, lecithin, tall oil, palm oil, and castor oil; and (b) is selected from ethylene oxide, propylene oxide, a mixture of ethylene oxide and propylene oxide; and combinations thereof. The polyol component is usually present in the polyol premix composition in an amount of from about 60 wt. % to about 95 wt. %, preferably from about 65 wt. % to about 95 wt. %, and more preferably from about 70 wt. % to about 90 wt. %, by weight of the polyol premix composition.

Surfactant

The polyol premix composition next contains a silicone surfactant. The silicone surfactant is used to form a foam from the mixture, as well as to control the size of the bubbles of the foam so that a foam of a desired cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise.

Silicone surfactants for use in the preparation of polyurethane or polyisocyanurate foams are available under a number of trade names known to those skilled in this art. Such materials have been found to be applicable over a wide range of formulations allowing uniform cell formation and maximum gas entrapment to achieve very low density foam structures. The preferred silicone surfactant comprises a polysiloxane polyoxyalkylene block co-polymer. Some representative silicone surfactants useful for this invention are Momentive's L-5130, L-5180, L-5340, L-5440, L-6100, L-6900, L-6980 and L-6988; Air Products DC-193, DC-197, DC-5582, and DC-5598; and B-8404, B-8407, B-8409 and B-8462 from Evonik Industries AG of Essen, Germany. Others are disclosed in U.S. Pat. Nos. 2,834,748; 2,917,480; 2,846,458 and 4,147,847. The silicone surfactant component is usually present in the polyol premix composition in an amount of from about 0.5 wt. % to about 5.0 wt. %, preferably from about 1.0 wt. % to about 4.0 wt. %, and more preferably from about 1.5 wt. % to about 3.0 wt. %, by weight of the polyol premix composition.

The polyol premix composition may optionally contain a non-silicone surfactant, such as a non-silicone, non-ionic surfactant. Such may include oxyethylated alkylphenols, oxyethylated fatty alcohols, paraffin oils, castor oil esters, ricinoleic acid esters, turkey red oil, groundnut oil, paraffins, and fatty alcohols. A preferred non-silicone non-ionic surfactant is LK-443 which is commercially available from Air Products Corporation. When a non-silicone, non-ionic surfactant used, it is usually present in the polyol premix composition in an amount of from about 0.25 wt. % to about 3.0 wt. %, preferably from about 0.5 wt. % to about 2.5 wt. %, and more preferably from about 0.75 wt. % to about 2.0 wt. %, by weight of the polyol premix composition.

The Catalyst System

Applicants have generally found that it is difficult to identify amine catalysts which generate relatively low levels of fluoride ions when in contact with hydrohaloolefins while at the same time possessing sufficient activity characteristics to be acceptable for use in producing foams. In other words, applicants have found that a large number of amine catalysts can be identified which are relatively stable when in the presence of hydrdohaloolefins, but that such catalysts are generally not sufficiently active to provide the necessary foam reactivity. On the other hand, applicants have also found that a relatively large number of amine catalysts can be identified which are sufficiently active to produce acceptable foam reactivity but that such catalysts are generally not sufficiently stable for use in combination with hydrdohaloolefins, as measured by the generation of fluoride ions.

Based on testing performed by applicants, the following catalysts have been found to have the relative fluoride ion generation in the presence of 1234ze(E) as indicated below in Table 1.

TABLE 1

1234ze(E)

| CATALYST NO. | CATALYST | PPM, F- |
|---|---|---|
| 1 | diazabicyclo undecane | 226,944 |
| 2 | Diazabicyclooctane (triethylenediamine) | 99,000 |
| 3 | Tris-2,4,6-(dimehtylamino-methyl)-phnol/Bis(dimethylaminomethyl)-phenol | 7184 |
| 4 | Dimethylaminoethoxyethanol/ethylene glycol | 6020 |
| 5 | 1-methylimidazole | 4390 |
| 6 | polyoxypropylenediamine | 3732 |
| 7 | Pentamethyldiethylene-triamine | 3242 |
| 8 | Diethylcyclohexl | 1970 |
| 9 | diethanolamine | 1372 |
| 10 | N-mtheyldicyclohexyl-amine | 480 |
| 11 | Methyl(n-methylamino b-sodium acetate nonylphenol) 2- | 458 |
| 12 | Glycerol poly(oxypropylene) triamine | 216 |
| 13 | Diisopropylethylamine | 67 |
| 14 | Diethyltoluenediamine | 10 |
| 15 | 1,3,benzenediamine 4-methyl-2,6-bis(mehtylthio)/1,3-benzenediamine 2-methyl-4,6-bis (mehtylthio) | 3 |

In addition to the above, applicants have tested the reactivity of several of the above-noted catalysts, as measured by Gel Time in seconds in a typical panel foam formulation with the blowing agent consisting of 1234ze(E). The results are reported in Tables 2A and 2B provided below:

| Catalyst | Amount, php in panel system | Time to Foam Collapse, Days |
|---|---|---|
| PMDETA | 1.2 | 2.5 |
| PMDETA/Acid Block | 1.2 | 2.5 |
| PMDETA/Scavanger | 1.2/1.0 | 14 |
| DMCHA | 1.2 | 14 |
| Dicyclohexylmethyl | 4.0 | 14 |
| Dicyclohexylmethyl/Dibutyltin Dilaurate | 4/0.25 | 15+ |
| Diisopropylethyl | 8 | 15+ |

TABLE 2B

GEL TIMES, SEC

| CATALYSTS (FROM CHART ABOVE) | INITIAL | 2.5 DAYS | 14 DAYS | CHANGE % |
|---|---|---|---|---|
| PMDETA-Std | 78 | — | — | — |
| PMDETA/Acid Block | 270 | — | — | — |
| PMDETA/Scavenger | 75 | 88 | — | +17 |
| DMCHA | 140 | 145 | — | +3.5 |
| Dicyclohexylmethyl | 225 | 280 | 290 | +29 |
| Dicyclohexylmethyl/Dibutyltin Dilaurate | 55 | 65 | 72 | +31 |
| Diisopropylethyl | 310 | 370 | 375 | 21 |

Based upon the testing done by applicants, applicants have found that for blowing agents comprising, and preferably consisting essentially of 1234ze(E), the catalysts numbered 1-9 in Table 1 above are not generally preferred because of stability problems, as indicated by the high level of fluoride concentration. On the other hand, applicants have found that the catalysts numbered 12-15, while demonstrating a high level of stability, are generally not preferred because they are believed to be of not sufficient activity to produce acceptable foam reactivity. Unexpectedly and surprisingly, applicants have found that the catalysts numbered 10 and 11, namely, n-metheyldicyclohexyl-amine and methyl(n-methylamino b-sodium acetate nonylphenol) 2- are preferred in accordance with the present invention because they exhibit a highly desirable but difficult to achieve combination of stability and activity when used in combination with hydrohaloolefins.

Applicants have also surprisingly and unexpectedly found that from among hydrohaloolefins, 1233zd(E) is substantially less reactive with amine-catalysts in comparison to other hydrohaloolefins, and in particular hydrohalogenated propenes. More specifically, applicants have found as a result of testing that the catalysts identified in Table 3 below have the relative fluoride ion generation as indicated below in the presence of 1233zd(E), with foam reactivity performance generally tending from faster to slower as one moves from the top to the bottom of the list.

TABLE 3

1233zd(E)

| CATALYST NO./Tradename | CATALYST | PPM, F- |
|---|---|---|
| 1 Polycat DBU | DBU | 26,994 (estimated) |
| 2. Dabco 33LV | Diazabicyclooctane (triethylenediamine) | 9900 (estimated) |
| 2A Jeffamine D 230 | Polyoxypropylenediamine (Jeffamine D 230) | 2157 |
| 3 Dabco TMR-30 | Tris-2,4,6-(dimehtylamino-methyl)-phnol/Bis(dimehtylaminomethyl)-phenol | 1521 |

TABLE 3-continued

1233zd(E)

| CATALYST NO./Tradename | CATALYST | PPM, F- |
|---|---|---|
| 4 Jeffcat ZR 70 | Dimethylaminoethoxyethanol/ethylene glycol | 1753 |
| Toyocat RX5 | Bis(dimehtylaminoethyl) ether (Toyocat RX5) | 1002 |
| Polycat 9 | Bis(dimethylaminopropyl)-n (Polycat 9) | 754 |
| Polycat 30 | Tertiary amine (10-30%), gelling catalyst (30-60%) fatty amine (10-30%) | 548 |
| 5 Lupragen 1-methyl imidazole | 1-methylimidazole | 221 |
| 6 | polyoxypropylenediamine | 1919 |
| 7 Polycat 5 | Pentamethyldiethylene-triamine | 429 |
| Polycat 41 | Dimethylaminopropylhexahydrotrivazine, N,N',N" | 392 |
| 8 | Diethylcyclohexl | NT |
| 9 Dabco DEOA-LF | diethanolamine | 343 |
| Lupragen 1-methyl imidazole | 1-methylimidazole | 221 |
| Dabco H1010 | 50/50 blend water + amine salt | 171 |
| Toyocat DM70 | 70% 1,2 dimethylimidazole, 30% ethyleneglycol | 170 |
| Toyocat TRX | Trimerized catalyst | 129 |
| N-Methylmorpholine | N-methylmorpholine | 102 |
| DIPEA | Diisopropylethylamine | 67 |
| 10 Polycat 12 | n-methyldicyclohexyl-amine | 15 |
| 11 Curithane 52 | Methyl(n-methylamino b-sodium acetate nonylphenol) 2- | 190 |
| 12 Jeffamine T5000 | Glycerol poly(oxypropylene) triamine | 49 |
| K-Kat x614 Zinc | Zinc catalyst complex | 36 |
| Jeffcat DMDEE | 2,2-dimorpholineodiethylether | 24 |
| Polycat 12 | N-methyldicycohexyl-amine | 15-22 |
| Firstcure N,N-Dimethylparatoluidine | N,N-dimethylparatoluuidine | 20 |
| Ethacure 300 Curative | 3,5-dimethythio-2,4-toluenediamine | 9-16 |
| Tyzor TE Titanium | Titanium complex | 10 |
| Dabco MB20 | Bismuth carboxylate catalyst | 6 |
| Borchi Oxycoat 1101 | Iron catalyst | 2 |
| PUCAT 25 | Bismuth 2-ethylhexanoate (25%) | 1 |
| 13 | Diisopropylethylamine | NT |
| 14 Ethacure 100 curing agent | Diethyltoluenediamine | 24 |
| 15 Ethacure 300 Curative | 1,3,benzenediamine 4-methyl-2,6-bis(mehtylthio)/1,3-benzenediamine 2-methyl-4,6-bis (mehtylthio) | 16 |

NT—not tested

As can be seen from the results reported above, applicants have found that 1233zd(E) is many times more stable, as measured by fluoride ion generation, in the presence of amine catalysts than are other halogenated olefins, and particularly halogenated propenes. Moreover, an even more unexpectedly, applicants have found that 1-methylimidazole exhibits an exceptionally high level of stability while retaining a relatively high level of foam reactivity when used in combination with 1233zd(E). Similarly, applicants have unexpectedly found that n-methyldicyclohexyl-amine exhibits an exceptionally high level of stability while retaining a relatively high level of foam reactivity when used in combination with 1233zd(E).

Notwithstanding the unexpected and advantageous results described above regarding combinations of halogenated olefins and certain amine catalysts, applicants have found that even the best of such combinations is not fully satisfactory for many embodiments, and that further substantial and unexpected improvement can be achieved by replacing all or a substantial portion of the amine catalyst(s) with one or more metal catalysts, and even more preferably two or more catalysts wherein at least a first and a second of said catalysts is based upon a different metal. In general, applicants have found that metal catalysts are relatively nonreactive with halogenated olefins that are adaptable for use as blowing agents and therefore appear to produce a relatively stable system, and that with a judicious selection of at least a first and second metal catalyst surprisingly effective and stable compositions, systems and methods can be obtained.

Applicants have found that the use of a catalyst system based upon a single metal in many embodiments is not capable of fully satisfying the desired reactivity profile for the foamable composition and/or method. Applicants have found that surprising and highly beneficial results can be achieved by the selection of catalyst systems comprising a first metal catalyst wherein said first metal is selected from a metal catalysts exhibiting relatively high activity at low temperatures and a second metal catalyst wherein said second metal is selected from the catalytic metals tending to exhibit relatively high activity at higher temperatures. In certain preferred embodiments, the metal of the first metal catalyst is selected from the group consisting of kin, zinc, cobalt, lead and combinations of these. In certain preferred embodiments, the metal of the second metal catalyst is selected from the group consisting of bismuth, sodium, calcium and combinations of these. In highly preferred embodiments of the present invention, the catalyst system comprises a first metal catalyst and a second metal catalyst but is substantially free of amine catalyst.

Furthermore, applicants have found that blowing agents and foamable systems that are highly desirable in certain embodiments can be obtained by utilizing one or more of the preferred amine catalysts of the present invention in combination with at least one, and preferably at least two, metal catalysts according to the invention as described above.

In certain embodiments, the non-amine catalysts are inorgano- or organo-metallic compounds. Useful inorgano- or organo-metallic compounds include, but are not limited to, organic salts, Lewis acid halides, or the like, of any metal, including, but not limited to, transition metals, post-transition (poor) metals, rare earth metals (e.g. lanthanides), metalloids, alkali metals, alkaline earth metals, or the like. According to certain broad aspects of the present invention, the metals may include, but are not limited to, bismuth, lead, tin, zinc, chromium, cobalt, copper, iron, manganese, magnesium, potassium, sodium, titanium, mercury, zinc, antimony, uranium, cadmium, thorium, aluminum, nickel, cerium, molybdenum, vanadium, zirconium, or combinations thereof. Non-exclusive examples of such inorgano- or organo-metallic catalysts include, but are not limited to, bismuth nitrate, lead 2-ethylhexoate, lead benzoate, lead naphthanate, ferric chloride, antimony trichloride, antimony glycolate, tin salts of carboxylic acids, dialkyl tin salts of carboxylic acids, potassium acetate, potassium octoate, potassium 2-ethylhexoate, potassium salts of carboxylic acids, zinc salts of carboxylic acids, zinc 2-ethylhexanoate, glycine salts, alkali metal carboxylic acid salts, sodium N-(2-hydroxy-5-nonylphenol)methyl-N-methylglycinate,
tin (II) 2-ethylhexanoate, dibutyltin dilaurate, or combinations thereof. In certain preferred embodiments the catalysts are present in the polyol premix composition in an amount of from about 0.001 wt. % to about 5.0 wt. %, 0.01 wt. % to about 3.0 wt. %, preferably from about 0.3 wt. % to about 2.5 wt. %, and more preferably from about 0.35 wt. % to about 2.0 wt. %, by weight of the polyol premix composition. While these are usual amounts, the quantity amount of the foregoing catalyst can vary widely, and the appropriate amount can be easily be determined by those skilled in the art.

Furthermore, applicants have found that it is desirable to use certain metal catalysts in foamable and foaming systems having relatively high levels of water. More specifically, applicants have found that catalysts based on tin and potassium are preferred in such systems because of their ability to retain their reactivity and avoid stability problems in such high water systems. Furthermore, applicants have found that catalysts based upon zinc and bismuth have a tendency to precipitate out of the formulation, especially in systems having relatively high water content, although such catalysts have desirable performance profiles to the extent precipitation can be avoided. For this reason, it is preferred in certain systems that the metal catalysts comprise at least a first catalysts based upon tin and/or zinc, and a second catalyst based upon potassium and/or bismuth.

In another embodiment of the invention, the non-amine catalyst is a quaternary ammonium carboxylate. Useful quaternary ammonium carboxylates include, but are not limited to: (2-hydroxypropyl)trimethylammonium 2-ethylhexanoate (TMR® sold by Air Products and Chemicals) and (2-hydroxypropyl)trimethylammonium formate (TMR-2® sold by Air Products and Chemicals). These quaternary ammonium carboxylate catalysts are usually present in the polyol premix composition in an amount of from about 0.25 wt. % to about 3.0 wt. %, preferably from about 0.3 wt. % to about 2.5 wt. %, and more preferably from about 0.35 wt. % to about 2.0 wt. %, by weight of the polyol premix composition. While these are usual amounts, the quantity amount of catalyst can vary widely, and the appropriate amount can be easily be determined by those skilled in the art.

In another embodiment, as mentioned above, the non-amine catalyst is used in combination with an amine catalyst. Such amine catalysts may include any compound containing an amino group and exhibiting the catalytic activity provided herein. Such compounds may be straight chain or cyclic non-aromatic or aromatic in nature. Useful, non-limiting, amines include primary amines, secondary amines or tertiary amines. Useful tertiary amine catalysts non-exclusively include N,N,N',N'',N''-pentamethyldiethyltriamine, N,N-dicyclohexylmethylamine; N,N-ethyldiisopropylamine; N,N-dimethylcyclohexylamine; N,N-dimethylisopropylamine; N-methyl-N-isopropylbenzylamine; N-methyl-N-cyclopentylbenzylamine; N-isopropyl-N-sec-butyl-trifluoroethylamine; N,N-diethyl-(α-phenylethyl)amine, N,N,N-tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-(α-phenylethyl)amine; or combinations thereof. Useful primary amine catalysts non-exclusively include: triphenylmethylamine and 1,1-diethyl-n-propylamine.

Other useful amines includes morpholines, imidazoles, ether containing compounds, and the like. These include:
dimorpholinodiethylether
N-ethylmorpholine
N-methylmorpholine
bis(dimethylaminoethyl) ether
imidizole
n-methylimidazole
1,2-dimethylimidazole
dimorpholinodimethylether
N,N,N',N',N'',N''-pentamethyldiethylenetriamine
N,N,N',N',N'',N''-pentaethyldiethylenetriamine
N,N,N',N',N'',N''-pentamethyldipropylenetriamine
bis(diethylaminoethyl) ether
bis(dimethylaminopropyl) ether.

In embodiments where an amine catalyst is provided, the catalyst may be provided in any amount to achieve the function of the instant invention without affecting the foam forming or storage stability of the composition, as characterized herein. To this end, the amine catalyst may be provided in amounts less than or greater than the non-amine catalyst.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol premix composition, and other materials such as optional flame retardants, colorants, or other additives. These foams can be rigid, flexible, or semi-rigid, and can have a closed cell structure, an open cell structure or a mixture of open and closed cells.

It is convenient in many applications to provide the components for polyurethane or polyisocyanurate foams in pre-blended formulations. Most typically, the foam formulation is pre-blended into two components. The isocyanate and optionally other isocyanate compatible raw materials, including but not limited to blowing agents and certain silicone surfactants, comprise the first component, commonly referred to as the "A" component. The polyol mixture composition, including surfactant, catalysts, blowing agents, and optional other ingredients comprise the second component, commonly referred to as the "B" component. In any given application, the "B" component may not contain all the above listed components, for example some formulations omit the flame retardant if flame retardancy is not a required foam property. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a stream to the mix head or reaction site. Most conveniently, however, they are all incorporated into one B component as described above.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. These are described in, for example, U.S. Pat. Nos. 4,868, 224; 3,401,190; 3,454,606; 3,277,138; 3,492,330; 3,001, 973; 3,394,164; 3,124.605; and 3,201,372. Preferred as a class are the aromatic polyisocyanates.

Representative organic polyisocyanates correspond to the formula:

R(NCO)z wherein R is a polyvalent organic radical which is either aliphatic, aralkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5, 5-'tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene disocyanate, polymethylene polyphenyl isocyanate, 2,4- and 2,6-toluene- diisocyanate, dianisidine diisocyanate, bitoylene isocyanate, naphthylene 1,4-diisocyanate, bis(4-isocyanatophenyl) methene, bis(2-methyl-4-isocyanatophenyl)methane, and the like. Preferred polyisocyanates are the polymethylene polyphenyl isocyanates, Particularly the mixtures containing from about 30 to about 85 percent by weight of methylenebis (phenyl isocyanate) with the remainder of the mixture comprising the polymethylene polyphenyl polyisocyanates of functionality higher than 2. These polyisocyanates are prepared by conventional methods known in the art. In the present invention, the polyisocyanate and the polyol are employed in amounts which will yield an NCO/OH stoichiometric ratio in a range of from about 0.9 to about 5.0. In the present invention, the NCO/OH equivalent ratio is, preferably, about 1.0 or more and about 3.0 or less, with the ideal range being from about 1.1 to about 2.5. Especially suitable organic polyisocyanate include polymethylene polyphenyl isocyanate, methylenebis(phenyl isocyanate), toluene diisocyanates, or combinations thereof.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art, including, but not limited to, glycine salts, tertiary amine trimerization catalysts, quaternary ammonium carboxylates, and alkali metal carboxylic acid salts and mixtures of the various types of catalysts. Preferred species within the classes are potassium acetate, potassium octoate, and sodium N-(2-hydroxy-5-nonylphenol)methyl-N-methylglycinate.

Conventional flame retardants can also be incorporated, preferably in amount of not more than about 20 percent by weight of the reactants. Optional flame retardants include tris(2-chloroethyl)phosphate, tris(2-chloropropyl)phosphate, tris(2,3-dibromopropyl)phosphate, tris(1,3-dichloropropyl)phosphate, tri(2-chloroisopropyl)phosphate, tricresyl phosphate, tri(2,2-dichloroisopropyl)phosphate, diethyl N,N-bis(2-hydroxyethyl) aminomethylphosphonate, dimethyl methylphosphonate, tri(2,3-dibromopropyl)phosphate, tri(1,3-dichloropropyl)phosphate, and tetra-kis-(2-chloroethyl)ethylene diphosphate, triethylphosphate, diammonium phosphate, various halogenated aromatic compounds, antimony oxide, aluminum trihydrate, polyvinyl chloride, melamine, and the like. Other optional ingredients can include from 0 to about 7 percent water, which chemically reacts with the isocyanate to produce carbon dioxide. This carbon dioxide acts as an auxiliary blowing agent. Formic acid is also used to produce carbon dioxide by reacting with the isocyanate and is optionally added to the "B" component.

In addition to the previously described ingredients, other ingredients such as, dyes, fillers, pigments and the like can be included in the preparation of the foams. Dispersing agents and cell stabilizers can be incorporated into the present blends. Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol. A pigment which can be used herein can be any conventional pigment such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

The polyurethane or polyisocyanurate foams produced can vary in density from about 0.5 pounds per cubic foot to about 60 pounds per cubic foot, preferably from about 1.0 to 20.0 pounds per cubic foot, and most preferably from about 1.5 to 6.0 pounds per cubic foot. The density obtained is a function of how much of the blowing agent or blowing agent mixture disclosed in this invention plus the amount of auxiliary blowing agent, such as water or other co-blowing agents is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well known applications, including but not limited to thermal insulation, cushioning, flotation, packaging, adhesives, void filling, crafts and decorative, and shock absorption.

The following non-limiting examples serve to illustrate the invention.

Example 1

Spray Foam

Two typical commercial polyol spray-foam formulations are formed in accordance with Table E1A below:

TABLE E1A

| Components | Polyol Blend, 50° F. (10° C.) | |
|---|---|---|
| | 245fa php | 1233zd(E) php |
| Mannich polyether polyol having an OH# 470 (Veranol 470X) | 40 | 40 |
| Aromatic polyester polyol (Terate 4020) | 60 | 60 |
| Silicone surfactant (Dabco DC193) | 2.0 | 2.0 |
| Potassium octoate solution - 15% in diethylene glycol (Dabco K-15) | 1.4 | 1.4 |
| Polycat 5 (pentamethyldiethylene-triamine) | 1.4 | 1.4 |
| Dabco 33LV (Diazabicyclooctane (triethylenediamine) | 0.7 | 0.7 |
| TCPP (tris (2-chloroisopropyl) phosphate (Antiblaze TMCP(AB80)) | 20 | 20 |
| Water | 2 | 2 |
| 245fa | 20 | 0 |
| 1233zd(E) | 0 | 20 |
| Isocyanate, 70° F. (21° C.) | | |
| Polymethyldiisocyanate (PMDI) (Lupranate M20S) | ISO Index = 150 | ISO Index = 150 |

The formulations are maintained for up to 168 hours at about 52 C. Three different foams are formed from each formulation: one essentially upon initial formulation; one after about 62 hours of aging; and one after 168 hours of aging. Gel time is observed for each of the foams thus formed and the results are provided in FIG. 1.

As can be seen from the above example and the results illustrated in FIG. 1, the gel time for a typical foam formulation, particularly a spray foam formulation, increases substantially (63% after 62 hours and 113% after 168 hours) when the blowing agent consists of 1233zd as the foamable composition is aged when a typical catalyst formulation is used, especially in comparison to level of increased which is observed for saturated blowing agent materials such as HFC-245fa. Those skilled in the art would appreciate that such performance is generally considered not acceptable for many commercial embodiments.

Example 2

Spray Foam Without Catalyst

A typical commercial polyol spray-foam formulations, except with no catalyst present, is formed in accordance with Table E2 below.

TABLE E2

| Components | php |
|---|---|
| Polyol Blend, 50° F. (10° C.) | |
| Voranol ® 470X | 40 |
| Terate 4020 ® | 60 |
| Dabco ® DC193 | 2 |
| Water | 2 |
| Antiblaze ® AB80 | 20 |
| 1233zd(E) | 20 |
| Isocyanate, 70° F. (21° C.) | |
| Lupranate ® M20S | ISO Index = 150 |

After testing for stability, the results are as indicated FIG. 2.

The results reported above and illustrated in FIG. 2 indicate that 1233zd(E) is acceptable as a blowing agent for use in combination with typical commercially used polyol compounds, including particularly polyol compounds used in typical commercial spray foam applications without catalyst.

Example 3A

Spray Foam With Catalyst

A polyol spray-foam formulation according to the present invention is formed using the preferred blowing agent 1233zd(E) but with a less-preferred catalyst system consisting of a single bismuth metal catalyst and a non-preferred amine-based catalyst in accordance with Table E3A below:

TABLE E3A

| Components | Php |
|---|---|
| Polyol Blend, 50° F. (10° C.) | |
| Voranol ® 9 470X (Mannich polyether polyol) | 40.0 |
| Terate ® 10 4020 (Aromatic polyester polyol) | 60.0 |
| Dabco ® 1 DC193 (Silicone surfactant) | 2.0 |
| Dabco K-15 | 1.4 |
| Polycat 5 | 1.4 |
| MB-20 Bismuth Catalyst | 0.7 |
| Antiblaze ® 13 AB80 | 20 |
| Water | 2 |
| 1233zd | 20 |
| Isocyanate, 70° F. (21° C.) | |
| Lupranate ® 3 M20S | Iso Index = 150 |

Acceptabe results are obtained.

Example 3B

Spray Foam With Catalyst

A polyol spray-foam formulation the same as Example 3A is formed using the preferred blowing agent 1233zd(E), except the catalyst is replaced with a more preferred catalyst system of the present invention consisting of a first metal (zinc) catalyst and second metal (bismuth) catalyst and a preferred amine-based catalyst in accordance with Table E3B:

TABLE E3B

| Components | Php |
|---|---|
| Polyol Blend, 50° F. (10° C.) | |
| Voranol ® 9 470X (Mannich polyether polyol) | 40.0 |
| Terate ® 10 4020 (Aromatic polyester polyol) | 60.0 |
| Dabco ® 1 DC193 (Silicone surfactant) | 2.0 |
| Dabco K-15 | 1.4 |
| Polycat 12 | 2.0 |
| K-Kat ® 11 XK-614 Zinc Catalyst | 2.0 |
| MB-20 Bismuth Catalyst | 0.7 |
| Antiblaze ® 13 AB80 | 20 |
| Water | 2 |
| 1233zd(E) | 20 |
| Isocyanate, 70° F. (21° C.) | |
| Lupranate ® 3 M20S | Iso Index = 150 |

After testing for stability, the results illustrated in FIG. 3 are obtained. As can be seen from the above example and the results illustrated in FIG. 3, the gel time for a typical foam formulation, particularly a spray foam formulation, did not increase after 62 hours and increased only 8% after 168 hours when the blowing agent consists of 1233zd and a preferred catalyst of the present invention is used. Those skilled in the art would appreciate that such performance is generally considered acceptable for many commercial embodiments and would appreciate that such an improvement in gel time performance is substantial, significant and surprising. In FIG. 3, the data represented by the white column and labeled "1233zd(E)" corresponding to the results from the formulation in Example 2 and the data represented by the green column and labeled "1233zd(E)+ modified catalyst" corresponds to the results from formulation in this Example 3B.

The results reported in this example illustrate the surprising and highly beneficial advantages associated with use of blowing agents, foamable compositions, foams and foaming methods using the preferred catalysts of the present invention.

Example 3C

Spray Foam With Catalyst

A polyol spray-foam formulation different than the formulation used in Example 3A is formed using the preferred blowing agent 1233zd(E) as reported in Table E3C below.

TABLE E3C

| Components | Php |
|---|---|
| Polyol Blend, 40° F. (4.4° C.) | |
| Polyether polyol EDA-PO, EDA-PO/EO (50/50) | 70 |
| Mannich polyol (OH 350) | 30.0 |
| Dabco ® 1 DC193 (Silicone surfactant) | 1.5 |
| Lead (20%) | 0.5 |
| Dabco K-15 | 1.5 |

TABLE E3C-continued

| Components | Php |
|---|---|
| Polycat 12 | 2.0 |
| K-Kat ® 11 XK-614 Zinc Catalyst | 2.0 |
| K-Kat XK-227 Bismuth Catalyst | 0.7 |
| Antiblaze ® 13 AB80 | 20 |
| Water | 1.5 |
| 1233zd(E) | 30 |
| Isocyanate, 70° F. (21° C.) | |
| Lupranate ® 3 M20S | Iso Index = 150 |

As can be seen from the table above, the type and amounts of the various components are changed, but a catalyst consisting of a first metal (zinc) catalyst and second metal (bismuth) catalyst and a preferred amine-based catalyst is used.

The gel time for this typical foam formulation, particularly a spray foam formulation, did not increase after three months storage at room temperature when the blowing agent consists of 1233zd and a preferred catalyst of the present invention is used as per Table E3A. Those skilled in the art would appreciate that such performance is generally considered acceptable for many commercial embodiments and would appreciate that such an improvement in gel time performance is substantial, significant and surprising.

Example 4

Comparative Example

A polyol (B Component) formulation was made up of 100 parts by weight of a polyol blend, 1.5 parts by weight Niax L6900 silicone surfactant, 1.5 parts by weight water, 1.2 parts by weight pentamethyldiethylenetriamine (sold as Polycat 5 by Air Products and Chemicals) catalyst, and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (112.2 parts) was then aged at 130° F. for 62 hours, and then combined with 120.0 parts of M20S polymeric isocyanate to make a foam. The foam was very poor in appearance with significant cell collapse. Significant yellowing of the polyol premix was noted during aging.

Example 5

Comparative Example

A polyol (B Component) formulation was made up of 100 parts by weight of a polyol blend, 1.5 parts by weight Niax L6900 silicone surfactant, 1.5 parts by weight water, 1.2 parts by weight pentamethyldiethylenetriamine (sold as Polycat 5 by Air Products and Chemicals) catalyst and 8 parts by weight blowing agent trans-1-chloro-3,3,3-trifluoropropene. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (112.2 parts) was then aged at 130 ° F. for 168 hours, and then combined with 120.0 parts of M20S polymeric isocyanate to make a foam. The foam was very poor in appearance with significant cell collapse. Significant yellowing of the polyol premix was noted during aging.

Example 6

Foam Test

A polyol (B Component) formulation was made up of 100 parts by weight of a polyol blend, 1.5 parts by weight Niax L6900 silicone surfactant, 1.5 parts by weight water, 2.0 parts by weight N,N-dicyclohexylmethylamine (sold as Polycat 12 by Air Products and Chemicals) catalyst, 1.75 parts by weight a bismuth based catalyst (sold as Dabco MB-20 by Air Products and Chemicals) and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (114.75 parts) was then aged at 130° F. for 336 hours, and then combined with 120.0 parts of M20S polymeric isocyanate to make a foam. The foam was excellent in appearance with no evidence of cell collapse. There was no yellowing of the polyol premix noted during aging.

Example 7

Foam Test

A polyol (B Component) formulation was made up of 100 parts by weight of a polyol blend, 1.5 parts by weight Niax L6900 silicone surfactant, 0.5 parts by weight water, 2.0 parts by weight N,N-dicyclohexylmethylamine (sold as Polycat 12 by Air Products and Chemicals) catalyst, 1.75 parts by weight of zinc 2-ethylhexanoate (sold as 30-3038 by Strem Chemicals) and 8 parts by weight trans-1-chloro-3,3,3-trifluoropropene blowing agent. The total B component composition, when freshly prepared and combined with 103.0 parts by weight of Lupranate M20S polymeric isocyanate yielded a good quality foam with a fine and regular cell structure. Foam reactivity was typical for a pour in place foam. The total B-side composition (113.75 parts) was then aged at 130° F. for 336 hours, and then combined with 103.0 parts of M20S polymeric isocyanate to make a foam. The foam was excellent in appearance with no evidence of cell collapse. There was no yellowing of the polyol premix noted during aging.

Example 8

Foam Test

A polyol (B Component) formulation was made up of 100 parts by weight of a polyol blend, 1.5 parts by weight Niax L6900 silicone surfactant, 1.0 parts by weight water, 2.0 parts by weight N,N-dicyclohexylmethylamine (sold as Polycat 12 by Air Products and Chemicals) catalyst, 1.75 parts by weight a Potassium based catalyst (sold as Dabco K15 by Air Products and Chemicals) and 8 parts by weight trans-1-chloro-3,3,3-trifluoropropene blowing agent. The total B component composition, when freshly prepared and combined with 112.0 parts by weight of Lupranate M20S polymeric isocyanate yielded a good quality foam with a fine and regular cell structure. Foam reactivity was typical for a pour in place foam. The total B-side composition (114.75 parts) was then aged at 130° F. for 504 hours, and then combined with 112.0 parts of M20S polymeric isocyanate to make a foam. The foam was good in appearance with only slight evidence of cell collapse. There was very slight yellowing of the polyol premix noted during aging.

Example 9

Foam Test

A polyol (B Component) formulation was made up of 100 parts by weight of a polyol blend, 1.5 parts by weight Niax L6900 silicone surfactant, 1.5 parts by weight water, 2.0 parts by weight methyl(n-methylamino b-sodium acetate nonylphenol) 2-catalyst, 1.75 parts by weight a bismuth based catalyst (sold as Dabco MB-20 by Air Products and Chemicals) and 8 parts by weight trans-1,3,3,3-tetrafluoropropene blowing agent. The total B component composition, when freshly prepared and combined with 120.0 parts by weight of Lupranate M20S polymeric isocyanate yielded a good quality foam with a fine and regular cell structure. Foam reactivity was typical for a pour in place foam. The total B-side composition (114.75 parts) was then aged at 130° F. for 336 hours, and then combined with 120.0 parts of M20S polymeric isocyanate to make a foam. The foam was excellent in appearance with no evidence of cell collapse. There was no yellowing of the polyol premix noted during aging.

Example 10

Foam Test

A polyol (B Component) formulation was made up of 100 parts by weight of a polyol blend, 1.5 parts by weight Niax L6900 silicone surfactant, 0.5 parts by weight water, 2.0 parts by weight methyl(n-methylamino b-sodium acetate nonylphenol) 2-, 1.75 parts by weight of zinc 2-ethylhexanoate (sold as 30-3038 by Strem Chemicals) and 8 parts by weight trans-1-chloro-3,3,3-trifluoropropene blowing agent. The total B component composition, when freshly prepared and combined with 103.0 parts by weight of Lupranate M20S polymeric isocyanate yielded a good quality foam with a fine and regular cell structure. Foam reactivity was typical for a pour in place foam. The total B-side composition (113.75 parts) was then aged at 130° F. for 336 hours, and then combined with 103.0 parts of M20S polymeric isocyanate to make a foam. The foam was excellent in appearance with no evidence of cell collapse. There was no yellowing of the polyol premix noted during aging Example 11

Foam Test

A polyol (B Component) formulation was made up of 100 parts by weight of a polyol blend, 1.5 parts by weight Niax L6900 silicone surfactant, 1.0 parts by weight water, 2.0 parts by weight methyl(n-methylamino b-sodium acetate nonylphenol) 2-, 1.75 parts by weight a Potassium based catalyst (sold as Dabco K15 by Air Products and Chemicals) and 8 parts by weight trans-1-chloro-3,3,3-trifluoropropene blowing agent. The total B component composition, when freshly prepared and combined with 112.0 parts by weight of Lupranate M20S polymeric isocyanate yielded a good quality foam with a fine and regular cell structure. Foam reactivity was typical for a pour in place foam. The total B-side composition (114.75 parts) was then aged at 130° F. for 504 hours, and then combined with 112.0 parts of M20S polymeric isocyanate to make a foam. The foam was good in appearance with only slight evidence of cell collapse. There was very slight yellowing of the polyol premix noted during aging.

What is claimed is:

1. A storage stable foamable composition that has been stored for a period of at least two months comprising:
   a. a hydrohaloolefin blowing agent consisting essentially of transHCFO-1233zd, or transHFO-1234ze, or combinations of these,
   b. one or more polyols,
   c. one or more surfactants, and
   d. a catalyst system comprising at least a zinc metal and/or at least a bismuth metal, and at least one amine catalyst selected from n-metheyldicyclohexyl-amine, methyl(n-methylamino b-sodium acetate nonylphenol) 2-and combinations of these, wherein said foamable composition after said two month storage period has no substantial increase in gel time.

2. The foamable composition of claim 1 wherein said bismuth metal catalyst is selected from the group consisting of bismuth nitrate catalyst(s), and said zinc metal catalyst is selected from the group consisting of zinc salts of carboxylic acids, zinc 2-ethylhexanoate, and combinations thereof.

3. The foamable composition of claim 2 wherein said catalyst comprises bismuth metal catalyst and zinc metal catalyst and wherein each of said bismuth metal catalyst and said zinc metal catalyst together are present in an amount of about 0.001 wt. % to about 5.0 wt. %, by weight of the composition.

4. The foamable composition of claim 1 further comprising a quaternary ammonium carboxylate.

5. The foamable composition of claim 4 wherein said quaternary ammonium carboxylate is (2-hydroxypropyl) trimethylammonium 2-ethylhexanoate or (2-hydroxypropyl) trimethylammonium formate.

6. The foamable composition of claim 5 wherein said quaternary ammonium carboxylate is present in an amount of about 0.25 wt. % to about 3.0 wt. %, by weight of the composition.

7. The foamable composition of claim 1 wherein said blowing agent further comprises a co-blowing agent selected from the group consisting of water, hydrocarbon, fluorocarbon, chlorocarbon, hydrochlorofluorocarbon, hydrofluorocarbon, halogenated hydrocarbon, ether, ester, alcohol, aldehyde, ketone, organic acid, gas generating material, and combinations thereof.

8. The foamable composition of claim 2 wherein said blowing agent comprises in substantial proportion 1233zd (E).

9. The foamable composition of claim 1 wherein said amine catalyst comprises n-metheyldicyclohexyl-amine.

10. The foamable composition of claim 1 wherein the amine catalyst comprises methyl(n-methylamino b-sodium acetate nonylphenol) 2-.

* * * * *